United States Patent [19]

Berger

[11] Patent Number: 4,649,514
[45] Date of Patent: Mar. 10, 1987

[54] COMPUTER REVISION PORT

[75] Inventor: Michael F. Berger, Fort Worth, Tex.

[73] Assignee: Tandy Corporation, Fort Worth, Tex.

[21] Appl. No.: 556,466

[22] Filed: Nov. 30, 1983

[51] Int. Cl.⁴ .......................... G06F 9/00; G06F 11/00
[52] U.S. Cl. ........................................ 364/900; 371/15
[58] Field of Search ... 364/200 MS File, 900 MS File; 371/18, 19, 20, 15, 16

[56] References Cited

U.S. PATENT DOCUMENTS

| 3,928,830 | 12/1975 | Bellamy et al. | 371/29 |
| 4,138,599 | 2/1979 | Munter | 371/15 |
| 4,234,926 | 11/1980 | Wallace et al. | 364/900 |
| 4,468,731 | 8/1984 | Johnson et al. | 364/200 |
| 4,484,270 | 11/1984 | Quernemoen et al. | 364/200 |
| 4,578,773 | 3/1986 | Desai et al. | 371/15 |

Primary Examiner—James D. Thomas
Assistant Examiner—William G. Niessen
Attorney, Agent, or Firm—Wolf, Greenfield & Sacks

[57] ABSTRACT

Circuitry for automatically configuring the operating system software of a computer is disclosed. The circuitry includes a revision port which generates a unique eight-bit code indicating the latest revision level of the main circuit board in the computer. Each time revisions are made in the board during manufacturing or each time a circuit board containing new revisions is put into the system by maintenance or service personnel, the eight-bit code generated by the port is changed. During the process of configuring the operating system software, the central processing unit reads the code generated by the port and uses the revision information to load and link software routines which will operate properly with the revised circuitry.

3 Claims, 1 Drawing Figure

COMPUTER REVISION PORT

FIELD OF THE INVENTION

This invention relates to computer circuitry and, in particular, to arrangements for configuring the operating system software of a computer.

BACKGROUND OF THE INVENTION

In a typical computer system a programmer writing application programs has control over the manipulation and transfer of information between the computer's main memory and peripheral devices and external memory. However, at the application program level this information transfer is specified in general commands such as "file" or "get". The application programmer does not usually concern himself with the details of exactly how the requested information is located, transferred and checked for errors. Detailed control of the various components of the system is usually reserved for the operating system software.

The operating system software is a collection of software routines such as device drivers, file manipulation routines, utility routines and scheduling routines which, in conjunction with an applications program, coordinate and control, in minute detail, the operation of a computer system including transfer of information from peripheral units and external memory into the computer main memory and scheduling of various tasks and application programs.

Since a particular operating system routine must exercise detailed control over the operation of a specific piece of computer circuitry, it is necessary for the routine to recognize and handle the particular patterns of signals and commands and handle the timing constraints associated with that piece of circuitry. Consequently, if the circuitry is changed in any significant way, the associated software routine must often be changed in order to operate properly.

Accordingly, when operating system software is assembled by linking the various software routines, the correct revision levels of all the circuits and pieces of hardware which form the computer system must be known. Once the correct revision levels of all the circuits are known the correct software routines can be assembled to create the operating system software.

During the process of manufacturing computer circuitry, revisions are often made in the computer circuitry to improve performance and lower cost. While it is normally a straightforward procedure for the operating system software to be assembled by the manufacturer of the computer system, using a list of the revised circuits, confusion may result if revised and unrevised circuitry is on the assembly line at the same time. This confusion often results in an incorrect operating system being assembled, in turn, causing customer dissatisfaction.

In addition, it is often necessary for the customer himself to assemble an operating system at a later time if equipment is added or deleted from the system. Further, if the system is returned to the manufacturer to repair malfunctioning circuitry, often existing circuitry is replaced with new circuitry which may contain circuit revisions which were made after the the original circuitry was installed in the system. Thus, when the system is returned to the user the original operating system software may not work properly with the revised system.

In order for the user to revise the operating system software so that it will work with the new circuitry, it is necessary for him to have a complete list of the actual circuitry and the current revision levels in the computer system. Often this list is difficult to obtain or there may be confusion as to what revision level has been installed in the machine. Consequently, the operating software may be assembled with a software routine which does not match the actual circuitry in the system and may not operate properly.

It is therefore an object of the present invention to provide circuitry which will assist in automatically configuring the operating system software in a computer system.

It is another object of the present invention to provide circuitry which will automatically configure operating system software to the latest revision level of the circuits found in the computer system.

It is yet another object of the present invention to assist in automatically configuring the operating system in a computer system utilizing simple and inexpensive circuitry.

It is yet another object of the present invention to provide circuitry which will assist in configuring the operating system software in a computer system and which can be easily programmed with current revision level information during the manufacturing process or by service personnel.

It is a further object of the present invention to provide circuitry which can assist in configuring the operating system software in a computer system without manual intervention.

SUMMARY OF THE INVENTION

The foregoing objects are achieved in one illustrative embodiment of the invention in which a revision port is provided which generates a unique code indicating the revision level of the logic boards in the computer system. The revision port appears as a peripheral port on the computer's peripheral bus and can be read by the central processing unit during the assembling of the operating system software so that the correct software drivers and other routines can be assembled into the operating system software.

In particular, a code number generator is connected to one port of a programmable peripheral interface. Another port of the programmable interface is connected as a control port. When predetermined control signals are written to the latter port, the code number bits are gated onto the computer's peripheral bus where the information can be read by the central processing unit and used to assist with the generation of the operating system software.

The number generator may be programmed with the appropriate revision information either by reconfiguring the printed circuit board etch during manufacturing, jumpering by service personnel or by other programming means.

DETAILED DESCRIPTION OF THE PREFERRED EMBODIMENT

Figure 1:
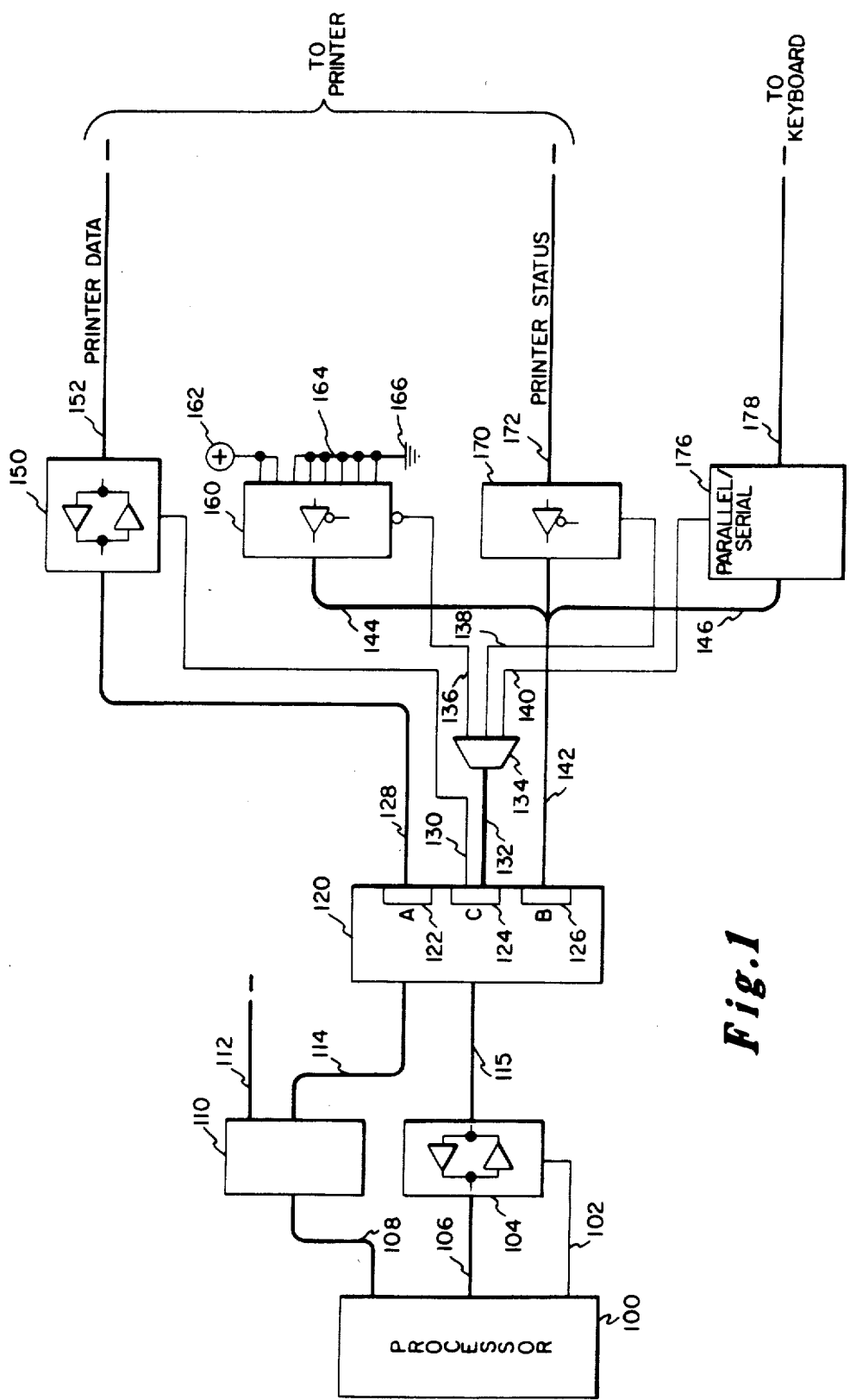
FIG. 1 of the drawing is an electrical schematic diagram of a computer system incorporating the inventive revision port.

FIG. 1 shows a block diagram of a portion of a computer system. In particular, the portion of the circuitry shown is the central processing unit (CPU) 100 and the circuitry for communicating between CPU 100 and peripheral units, such as printers, keyboards and, in accordance with the present invention, number generator 160.

Processor 100 is a conventional processor, the details of which are not important for an understanding of the present invention. A processor suitable for use with the illustrative embodiment is a model 8086 central processing unit manufactured by the Intel Corporation, 3065 Bowers Ave., Santa Clara, Calif. 95051. CPU 100 generates data signals on data bus 106 and control signals on control bus 108. Although busses 106 and 108 are shown as the single heavy line, it should be understood that these busses consist of a plurality of leads each of which carries a separate signal.

Bus 106 simultaneously carries a plurality of data signals. Depending on the make and model of CPU 100, bus 106 may have 8, 16, or 32 data bits (the illustrative 8086 CPU has 16 data bits). Data signals on data bus 106 can be connected to the remainder of the system by means of bi-directional buffers. In particular data bus 106 can be connected to peripheral bus 115 for communication between CPU 100 and various peripheral units by buffers 104. Other buffers (not shown) may connect data bus 106 with other buses for transfer of data between the data bus and other units.

Buffers 104 are conventional devices which are responsive to a low signal at an enable input to enable data transfer between bus 106 and bus 115. When the buffers are disabled their outputs assume a high impedance state, thereby effectively disconnecting bus 106 from bus 115. Buffers 104 are controlled by enable signals generated by CPU 100 on lead 102. Buffer devices suitable for use with the illustrative embodiment are device models 74LS245 manufactured by various semiconductor device manufacturers.

CPU control signals on bus 108 are provided to control decoding logic 110 which logically combines the signals and generates control and enable signals which are used to control various portions of the circuitry. Such logic is conventional and will not be described in detail hereinafter. Some of the control signals generated by logic 110 are provided over bus 112 to other portions of the circuitry (not shown). Other control signals are provided, via bus 114, to a peripheral interface unit 120.

Unit 120 is a conventional programmable peripheral interface which has three ports - port 122 (labelled port A), port 124 (labelled port C) and port 126 (labelled port B). In accordance with well-known operation, interface 120 can be programmed by means of control signals on bus 114 and data signals on bus 115 to transfer data signals from peripheral bus 115 to any one of ports 122, 124 or 126 or to generate a programmed pattern of signals at one or more of the ports. An interface which is suitable for use with the illustrative embodiment is a model 8255A-5 Programmable Peripheral Interface manufactured by the Intel Corporation referred to above.

Illustratively, interface 120 can be used to control data flow between the peripheral bus 115 and a line printer or a keyboard. In addition, in accordance with the invention, interface 120 can be used to interface between number generator 160 and bus 115.

Specificaly, when interface 120 is used to control a line printer, port 122 (port A) is programmed by CPU 100 to transfer data between peripheral bus 115, via to bus 128, to bus buffer 150. Buffer 150 is similar to driver 104 in that it has a high impedance state and when it is not enabled bus 152 is efffectively disconnected from bus 128. A buffer circuit suitable for use with the present invention is a model 74LS245 manufactured by various semiconductor circuit manufacturers.

Port 124 (port C) is programmed to generate control signals. One of these control signals is generated on lead 130 and it enables bus buffer 150 to provide data between bus 128 and bus 152. Bus 152 communicates with the printer. Other control signals are also generated at port 124 and provided, via bus 132, to control signal decoder 134 which generates a plurality of additional control signals.

More specifically, to send a byte of data from the peripheral bus to the printer, CPU 100 programs interface 120 to write a "1" to port 124, bit 0. This action produces a "high" signal on lead 130 which, in turn, enables bus buffer 150. A "00" is then written by processor 100 to port 124, bits 1 and 2. These bits are provided, via bus 132, to decoder 134 and cause a "low" signal to be generated on lead 138 which enables the status buffer 170. When buffer 170 is enabled it allows status information to be transferred between status bus 172 and bus 142 which is connected to port 126 of interface unit 120. Buffer 170 also has a high impedance state to disconnect bus 172 from bus 142. A device suitable for use as buffer 170 is a model 74LS244.

Therefore, in the configuration shown in FIG. 1, data can be passed to the printer via printer buffer 150 and the printer status signals can be received by a status buffer 170 and passed through peripheral interface 120 to peripheral data bus 115 and from there to CPU 100.

Peripheral interface 120 can also operate with a keyboard. In this case, port 124, bits 1 and 2 are set to the code "01". This signal combination causes control signal decoder 134 to place a "high" signal on lead 140 which enables the parallel-to-serial converter 176. Serial data appearing on lead 178 from the keyboard is provided to converter 176 where it is converted into parallel data which is provided, via busses 146 and 142, to port 126. From there the information can be transferred to peripheral bus 115 and, in turn, to CPU 100.

In accordance with the invention, number generator 160 is also connected to peripheral interface 120. Generator 160 may illustratively be connected to the peripheral interface port 126 (port B). Generator 160 is shown as a buffer with programmable inputs. It may alternatively comprise a shift register, a read-only memory or a random-access memory. The inputs may be programmed by leads etched into the printed circuit board etch during manufacture of the printed board, by means of removable straps or jumpers, as shown in FIG. 1, or may be programmed by other suitable means such as a circuit which forces the internal states of the generator 160 to a predetermined pattern.

Specifically, in FIG. 1, the inputs of generator 160 are shown selectively connected by electrical jumpers to ground 166 and positive voltage source 162 to produce the code number "00000011". This code number may correspond to a particular revision level in the circuitry contained in the system. When the revision level of the circuitry is changed, the etch pattern on the board or the position of the jumpers can be changed in order to modify the code number. Generally a unique code number will be assigned to each revision level.

In order to read the contents of generator 160 during an operating system assembly, CPU 100 programs interface 120, port 124, bits 1 and 2 to the code "10". This code combination enables command decoder 134 to place a "low" signal on lead 136 which, in turn, enables generator 160. Generator 160 is comprises of a high impedance buffer so that its outputs assume a high impedance state when the buffer is not enabled thereby effectively disconnecting the buffer from the bus 144. When the buffer comprising generator 160 is enabled, the preprogrammed code number appears on bus 144 where it is provided, via bus 142, to port 126 and from there, as previously described, to the CPU 100.

Although only one illustrative embodiment of the invention is shown other modifications within the skill of the art will be apparent. For example, other code combinations than those shown may be used without departing from the spirit and scope of the invention.

What is claimed is:

1. A computer system comprising,
    a central processing unit having a control bus for transferring control signals between said central processing unit and various peripheral units and a data bus for transferring data between said central processing unit and the remainder of the computer system, said central processing unit being comprised of a plurality of circuit modules subject to circuit revisions and means for assembling operating systems software;
    a programmable interface unit, said interface unit having a plurality of ports and being controlled by control signals on said control bus for transferring information between one of said ports and said data bus and for generating interface control signals at another of said ports when said central processing unit is assembling the operating system software;
    a control decoder responsive to said interface control signals for generating an enable control signal,
    a buffer circuit having a plurality of inputs and a plurality of outputs, said outputs being connected via said one of said ports of said programmable interface unit to said data bus in response to said enable control signal; and
    means for generating at said inputs of said buffer circuit a code number corresponding to the revision level of said circuit modules;
    said central processing unit including means for reading, during assembling of the operating system software, said code number from said data bus and for using said revision level information in said code number to load and link software routines which will operate properly with the revised circuit modules.

2. A computer system as defined in claim 1 wherein said means for generating a code number includes means for changing said code number when any of said circuit modules is revised.

3. A computer system as defined in claim 2 wherein said code number changing means comprises a plurality of jumper leads.

* * * * *